(12) United States Patent
Hale

(10) Patent No.: US 8,210,793 B2
(45) Date of Patent: Jul. 3, 2012

(54) RADIAL FLOW COMPRESSOR FOR A TURBO-SUPERCHARGER

(75) Inventor: Thomas Hale, Northampton (GB)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 1008 days.

(21) Appl. No.: 12/181,589

(22) Filed: Jul. 29, 2008

(65) Prior Publication Data
US 2009/0060708 A1    Mar. 5, 2009

(30) Foreign Application Priority Data

Jul. 30, 2007 (DE) .................. 10 2007 035 966

(51) Int. Cl.
*F04D 27/00* (2006.01)
*F04D 17/10* (2006.01)
(52) U.S. Cl. .................. 415/58.2; 415/206; 415/151
(58) Field of Classification Search .............. 415/1, 11, 415/58.2, 58.4, 151, 206
See application file for complete search history.

(56) References Cited

U.S. PATENT DOCUMENTS

| | | | |
|---|---|---|---|
| 3,504,986 A | | 4/1970 | Jackson |
| 3,958,416 A | * | 5/1976 | Hammond et al. .......... 60/737 |
| 5,180,278 A | * | 1/1993 | Warner .................. 415/27 |
| 6,467,270 B2 | * | 10/2002 | Mulloy et al. ............ 60/605.2 |
| 6,648,594 B1 | | 11/2003 | Horner et al. |
| 2007/0224032 A1 | * | 9/2007 | Gu et al. .................. 415/58.4 |
| 2008/0232952 A1 | * | 9/2008 | Gu et al. .................. 415/11 |

FOREIGN PATENT DOCUMENTS

| | | |
|---|---|---|
| DE | 1912623 A1 | 10/1969 |
| DE | 19823274 | 10/1999 |
| DE | 60015139 | 7/2006 |
| GB | 2319304 | 5/1998 |
| SU | 478957 A2 | 7/1975 |
| WO | WO-2005/071243 | 8/2005 |

OTHER PUBLICATIONS

English abstract for DE60015139.
English abstract for DE19823274.
European Search Report for EP-08160850.

* cited by examiner

*Primary Examiner* — Thao Le
*Assistant Examiner* — Sheng Zhu
(74) *Attorney, Agent, or Firm* — Rader, Fishman & Grauer PLLC

(57) ABSTRACT

The invention relates to a radial compressor for a turbocharger (5), in particular for an internal combustion engine,
with a compressor wheel (4) for conveying and compressing a gas, which has an axial intake end (7) and a radial exhaust end (8),
with a compressor wheel space (3), in which the compressor wheel (4) is arranged and which extends from the intake end (7) to the exhaust end (8),
with an inlet port (10) leading to the intake end (7) of the compressor wheel (4),
with at least one recirculation path (12) which opens at one end into the inlet port (10) and at the other end into the compressor wheel space (3).
To increase the efficiency of the compressor (1) and/or the charger (5) equipped with the compressor, a control device (15) is provided for varying the flow-through cross section, namely at least opening and closing the flow-through cross section, of the at least one recirculation path (12).

13 Claims, 2 Drawing Sheets

RADIAL FLOW COMPRESSOR FOR A TURBO-SUPERCHARGER

CROSS-REFERENCES TO RELATED APPLICATION

Figure 1:
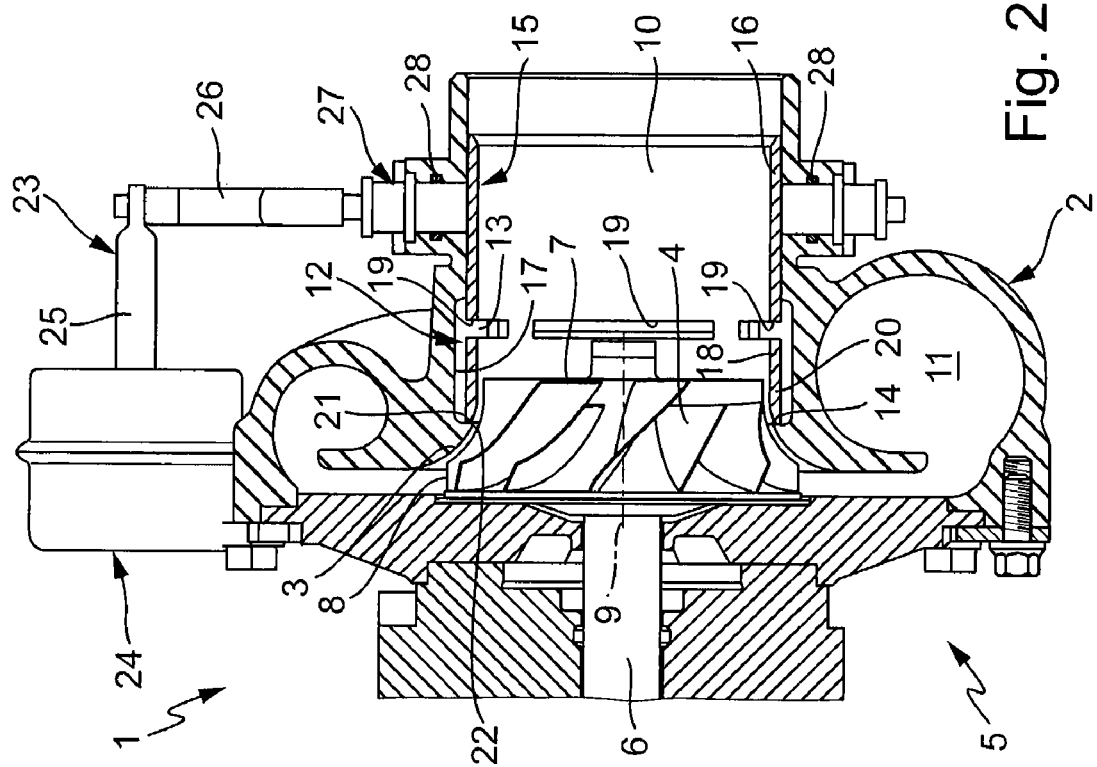

This application claims priority to German patent application DE 10 2007 035 966.9 filed Jul. 30, 2007, which is hereby incorporated by reference in its entirety.

The present invention relates to a radial compressor for a turbocharger, in particular for an internal combustion engine. The invention also relates to a turbocharger equipped with such a radial compressor and an operating method for such a radial compressor and/or turbocharger.

Turbochargers, in particular exhaust gas turbochargers, are used with internal combustion engines, for example, to raise the pressure level in the fresh gas in the exhaust-and-refill process. Such a turbocharger may be equipped with a radial compressor, comprising a compressor wheel to convey and compress the respective gas. To this end, the compressor wheel has an axial intake end and a radial exhaust end and is arranged in a compressor wheel space. An inlet port leads to the intake end of the compressor wheel and in the case of an internal combustion engine it leads to a low-pressure area of a fresh gas system equipped with a turbocharger. An exhaust port leads away from the exhaust end of the compressor wheel to the high-pressure side of the fresh gas system.

In internal combustion engines which are installed in motor vehicles, the mass flow rate of fresh gas to be supplied to the internal combustion engine varies in a relatively wide range. For example at partial load or in idling operation of the internal combustion engine, very low mass flow rates occur, whereas large mass flow rates occur accordingly at full load. An increase in power of the internal combustion engine due to charging of the fresh gas is desired not only at low loads but also at partial loads. At low mass flow rates, the compressor wheel designed for full load may reach a surge limit which leads to non-steady-state flow processes and in particular prevents a buildup of pressure by the compressor wheel.

To be able to maintain a sufficient distance from the surge limit even at low mass flow rates, i.e., to be able to achieve a certain supercharging even at lower mass flow rates, it is fundamentally possible to provide a recirculation path which is connected at one end to the inlet port upstream from the intake end of the compressor wheel and at the other end is connected to the compressor wheel space between the intake end and the exhaust end of the compressor wheel so they communicate. With the help of such a recirculation path, partially compressed gas can flow back to the low-pressure side, i.e., into the inlet port, so that the mass flow rate at the inlet port of the compressor wheel is artificially boosted. Due to the increased mass flow rate on the intake end, the desired distance from the surge limit can be maintained even if the mass flow rate on the exhaust end is lower than that at the intake end.

However, it has been found that such a recirculation path may be a disadvantage with higher mass flow rates and in particular may reduce the efficiency of the compressor. A reduced efficiency in the compressor can lead to an unwanted increase in temperature.

The present invention relates to the problem of providing an improved embodiment for a compressor and/or for a turbocharger and/or for a respective operating method, such that the embodiment is characterized in particular in that the compressor and/or the turbocharger has an increased efficiency.

This problem is solved according to the present invention by the subject matters of the independent claims. Advantageous embodiments are the subject matter of the dependent claims.

The invention is based on the general idea of embodying the recirculation path in a controllable manner, such that it can be at least opened and blocked. The advantages achievable in this way are obvious. At lower loads of an internal combustion engine equipped with the compressor and/or at lower mass flow rates, the recirculation path is opened, so that an increase in mass flow rate is achieved via the recirculated quantity of gas on the intake end of the compressor wheel, so that the compressor operates in a more stable manner in a known way. At higher loads and/or mass flow rates, the recirculation path may then be closed. As a result, the total mass flow rate entering on the intake end may be ejected in compressed form on the exhaust end. In this way, the performance of the compressor and in particular its efficiency are improved and thus the efficiency of a turbocharger equipped with such a compressor is improved.

It is possible to adjust the recirculation path exclusively between two states, namely the closed state and the open state. Such an embodiment may be achieved in a comparatively inexpensive manner. It is likewise fundamentally possible with another embodiment to be able to set at least one intermediate state on the recirculation path in which the recirculation path is essentially open but has a reduced flow-through cross section in comparison with the open state. Due to this design, the recirculation rate can be adapted to the mass flow rate in a continuous or incremental manner.

According to a particularly advantageous embodiment, it is also possible to provide for the recirculation path to be reopened at maximum mass flow rates. At very high mass flow rates, which may occur at full load and at a high rotational speed of the internal combustion engine, for example, the gas flowing in the area of the intake end may reach the velocity of sound, so that the mass flow rate is limited. Opening the recirculation path in this operating state means that an additional quantity of gas flows from the inlet port through the recirculation path into the compressor wheel space. In this operating state, there is thus no recirculation but instead there is an increase in the available flow-through cross section on the intake end, so that the mass flow rate that is compressible by the compressor can be increased on the whole.

Other important features and advantages of the invention are derived from the subclaims, the drawings and the respective description of the figures on the basis of the drawings.

It is self-evident that the features mentioned above and those yet to be explained below may be used not only in the particular combination given but also in other combinations or alone without going beyond the scope of the present invention.

Preferred exemplary embodiments of the invention are depicted in the drawings and are explained in greater detail in the following description, where the same reference numerals refer to the same or similar or functionally same components.

Figure 2:
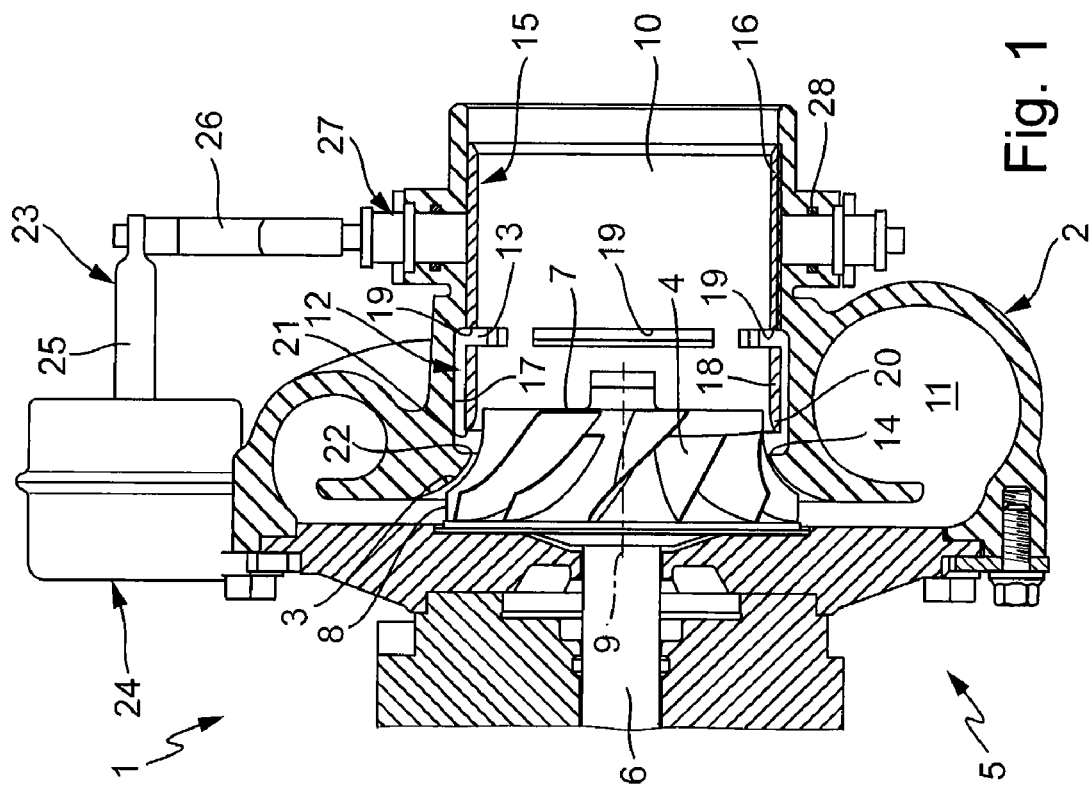
Figure 3:
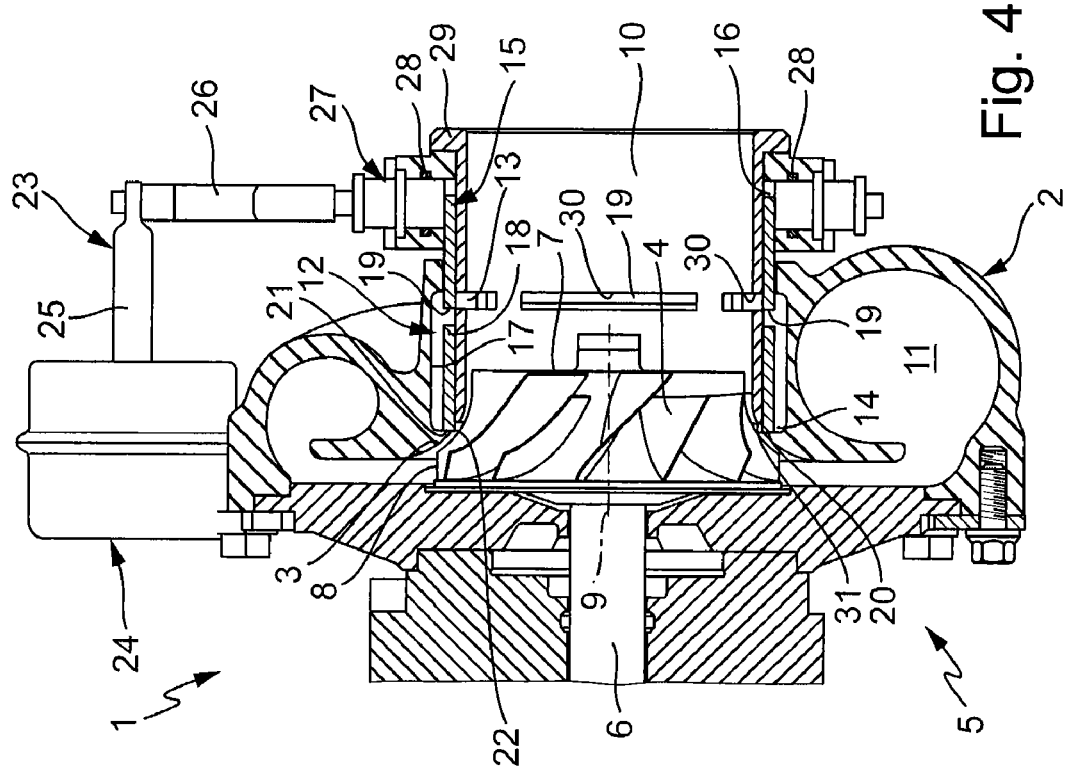
Figure 4:
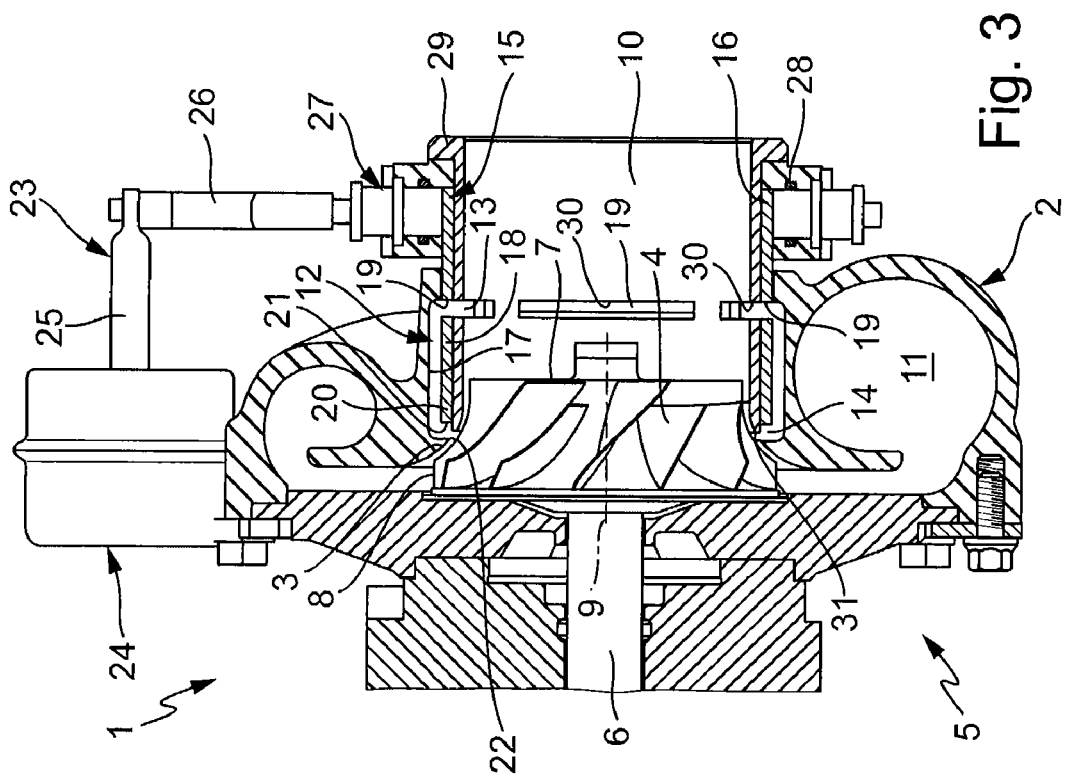

In schematic diagrams:

FIG. 1 shows an axial section through a compressor in a first embodiment and with the recirculation path opened, FIG. 2 shows a view like that in FIG. 1, but with the recirculation path closed, FIG. 3 shows a view like that in FIG. 1, but in a second embodiment, FIG. 4 shows a view like that in FIG. 3, but with the recirculation path closed.

According to FIGS. 1 through 4, a compressor 1 in a compressor housing 2 comprises a compressor wheel space 3 in which a compressor wheel 4 is arranged. The compressor 1 forms a component of a charging device (not shown otherwise) which may in particular be a turbocharger 5, which is shown only in part, namely to the extent of its compressor 1. A turbine of the turbocharger 5 is not shown here, but it drives a drive shaft 6, which is connected to the compressor wheel 4 in a rotationally fixed manner. The turbocharger 5 is an exhaust gas turbocharger in particular. The compressor 1 and/or the turbocharger 5 is/are preferably used in an internal combustion engine, which may be installed in a motor vehicle, in particular for supercharging fresh gas for use.

The compressor wheel 4 serves to convey and compress a gas, in particular fresh gas of an internal combustion engine. The compressor 1 is designed as a radial compressor. Accordingly, the compressor wheel 4 has an axial intake end 7 and a radial exhaust end 8. The directional terms "axial" and "radial" refer to the orientation of the axis 9 of rotation of the compressor wheel 4 and/or the drive shaft 6.

An inlet port 10 is formed in the compressor housing 2, leading to the intake end 7. Furthermore, the compressor housing 2 has an exhaust port 11, which leads away from the exhaust end 8 and may be designed in a helical configuration in the usual way and in particular may have a cross section that becomes wider in the direction of flow.

The radial compressor 1 has at least one recirculation path 12 which is characterized in that it communicates with the inlet port 10 on a first end 13 and communicates with the compressor wheel space 3 on a second end 14. Accordingly, the first path end 13 in the inlet port 10 is upstream from the intake end 7, while the second path end 14 in the compressor space room 3 is downstream from the intake end 7 and upstream from the exhaust end 8.

To control the at least one recirculation path 12, a control device 15 is designed so that with it a flow-through cross section of the at least one recirculation path 12 can be varied, at least for opening and closing, is provided. Accordingly, with the help of the control device 15, the respective recirculation path 12 can be adjusted at least between the open state shown in FIGS. 1 and 3 and the closed state shown in FIGS. 2 and 4. It is clear that with an appropriate design of the control device 15, it is possible to adjust essentially at least one or any number of intermediate states in which the flow-through cross section is larger than in the closed state and smaller than in the open state. In the embodiments shown here, the control device 15 has a control liner 16, which is arranged so that it is adjustable axially in the inlet port 10 between an open position shown in FIGS. 1 and 3 and a closed position shown in FIGS. 2 and 4.

The respective recirculation path 12 preferably comprises a radial recess 17 worked into the compressor housing 2. This recess 17 may form a ring that is closed in the circumferential direction. It is likewise possible to provide several such recesses 17 so they are distributed in the circumferential direction in the compressor housing 2. The number of these recesses 17 corresponds then to the number of recirculation paths 12. The respective recess 17 is thus bordered radially on the outside by the compressor housing 2. The control liner 16 is arranged so that it borders the recess 17 on the inside radially with at least one axial section 18 facing the compressor wheel 4. The respective recirculation path 12 within the recess 17 thus passes between the compressor housing 2 and the control liner 16. In its jacket, which is not shown in greater detail here, the control liner 16 has a radial passage 19. In the example shown here, the control liner 16 has four such passages 19 in the form of ring segments in its jacket, the ring segments being distributed around the circumferential direction. The recirculation path(s) 12 can communicate with the inlet port 10 through the respective passage(s) 19, at least in the open position of control liner 16.

In the embodiments shown here, the control liner 16 is also provided with an end section 20 on its end face which faces the compressor wheel 4, this end section being shaped and positioned in such a way that in the closed position of the control liner 16, it closes the second end 14 of the respective recirculation path 12 which opens into the compressor wheel space 3. This end section 20 may in particular have on the inside radially a contour which is adapted to the contour of the compressor housing 2 in the compressor wheel space 3, so that the control liner 6 conforms to the profile of the wall of the compressor housing 2 bordering the compressor wheel space 3 in a form-integrated manner.

In the embodiment shown in FIGS. 1 and 2, the control liner 16 forms a wall bordering the inlet port 10 and the compressor wheel space 3 in the area of the respective recess 17. The control liner 16 thus serves directly to guide the flow in the inflow area between the inlet port 10 and compressor wheel 4.

In the open position of the compressor liner 16 shown in FIG. 1, the compressor liner is positioned axially in the compressor housing 2 in such a way that its face end 21 facing the compressor wheel 4 is at a distance axially from the end 22 of the recess 17, which also faces the compressor wheel 4, so that the respective recirculation path 12 is open on its second end 14. The respective passage 19 is positioned axially in such a way that the first end of the respective recirculation path is also open in this relative position of the control liner 16.

In the closed position of the control liner 16 shown in FIG. 2, it is positioned in the compressor housing 2 in such a way that the face end 21 is in contact with the end 22 of the respective recess 17 on the compressor wheel end. Accordingly, the recirculation path 12 in the area of its second end 14 is closed. In this embodiment, the respective recirculation path 12 is connected to the inlet port 10 via the respective passage.

An actuating drive 23, which has an actuator 24, for example, is provided for axial adjustment of the control liner 16. The actuator 24 drives a twice-bent drive lever 26 via a drive rod 25, creating a rotational movement, which is converted by a drive device 27 into an axial movement of the control liner 16. The drive device 27 may be isolated from the inlet port 10 in an airtight manner via appropriate gaskets 28. The actuating drive 23 and/or its actuator 24 may be operated electrically, pneumatically or hydraulically. In addition, the actuating drive 23 may also have a design that differs from the design shown here.

In the embodiment shown in FIGS. 3 and 4, a port liner 29 arranged in a stationary position on the compressor housing 2 may also be provided in addition to the axially adjustable control liner 15. It is positioned in such a way that it borders the inlet port 10 and at least one portion of the compressor wheel space 3 on the outside radially. In the compressor wheel space 3, the port liner 29 forms part of a wall bordering the compressor wheel space 3. Furthermore, the port liner 29 overlaps the respective recess 17 in the axial direction and forms another border situated on the inside radially for the respective recess 17 in addition to the control liner 15. The port liner 29 and the control liner 15 are arranged coaxially with one another, with the control liner 16 being positioned so it is axially adjustable on the port liner 29 on the outside radially.

The port liner 29 also has at least one radial passage 30, which is arranged so it is essentially aligned with the first end 13 of the respective recirculation path 12. In the example shown here, four passages 30 in the form of ring segments arranged in distribution in the circumferential direction are also provided in the port liner 29. The respective recirculation path 12 can communicate through these passages 30 with the inlet port 10 at least when the control liner 16 is adjusted in its open position. An end face 31 of the port liner 29 facing the compressor wheel 4 is positioned in such a way that it is at a distance axially from the end 22 of the respective recirculation path 12 on the compressor wheel end to thus form the second end 14 of the recirculation path 12. Furthermore, the control liner 16 is dimensioned so that it extends axially along the respective recess 17 in the section 18 facing the compressor wheel 4 within the respective recess 17.

In the condition shown in FIG. 3, the control liner 16 is adjusted into its open position so that the recirculation path 12 is activated. In this state, the passages 30 of the port liner 29 are aligned radially with the passages 19 of the control liner 16 so that the first end 13 of the respective recirculation path 12 is open. Furthermore, the face end 21 of the control liner 16 is arranged at a distance axially from the respective end 22 of the recess 19, so that the second end 14 of the respective recirculation path 12 is also open.

In the situation shown in FIG. 4, the respective recirculation path 12 is deactivated, i.e., the control liner 16 is adjusted into its closed position. In this closed position, the face end 21 of the control liner 16 closes the second end 14 of the respective recirculation path 12 on the compressor wheel end by entering the gap formed by the distance between the face end 31 of the port liner 29 and the compressor wheel end 22 of the respective recess 21 and thereby filling it up. The contour of the control liner on its face end 21 is expediently adapted to the contour of the wall bordering the compressor wheel space 3, so that this wall has a form-integrated profile in the closed position of the control liner 16. Additionally or optionally, the respective recirculation path 12 may also be deactivated by the fact that in adjustment of the control liner 16, the corresponding passages 19 and 30 are no longer aligned radially, so that the control liner 16 passes over the respective passage 30 of the port liner 29 axially and thereby closes it.

The radial compressor 1 and/or the turbocharger 5 equipped therewith can be operated as follows, for example. The control liner 16 and/or the control device 15 can be operated as a function of the mass flow rate to be conveyed. It is preferably provided here that the control device 15 activates the respective recirculation path 12, i.e., opens it when in the range of low mass flow rates. Low mass flow rates occur, for example, when an internal combustion engine equipped with the turbocharger 5 is operated at partial load. For example, operation is in range of low mass flow rate when the rotational speed amounts to max. 40% of the maximum rotational speed and when the load is greater than 50% of a maximum load or full load. As soon as a high mass flow rate range has been reached, the control device 15 controls the respective recirculation path 12 so that it deactivates, i.e., is closed. A range of high mass flow rate occurs, for example, when the internal combustion engine is operated at medium loads or at full load but at a low rotational speed. For example, a range of high mass flow rates occurs when the rotational speed is between 40% and 70% of the max. rotational speed at any load. Essentially at least one transient operating state with at least one intermediate position is possible for the recirculation path 12.

According to an especially advantageous embodiment, it is possible to provide for the control device 15 to reopen the respective recirculation path 12 in a range of maximum flow rates. Maximum mass flow rates occur at full load, for example, and at high rotational speeds of the internal combustion engine. For example, a maximum mass flow rate range occurs when the rotational speed amounts to at least 70% of the maximum rotational speed and when the load is more than 50% of full load.

LIST OF REFERENCE NUMERALS 1 compressor
2 compressor housing
3 compressor wheel space
4 compressor wheel
5 turbocharger
6 drive shaft
7 intake end of 4
8 exhaust end of 4
9 axis of rotation of 4
10 inlet port
11 exhaust port
12 recirculation path
13 first end of 12
14 second end of 12
15 control device
16 control liner
17 recess
18 section of 16
19 passage in 16
20 end section of 16
21 end of 16
22 end of 17
23 actuating drive
24 actuator
25 drive rod
26 drive lever
27 drive device
28 gasket
29 port liner
30 passage in 29
31 end of 29

The invention claimed is:

1. A radial compressor for a turbocharger, in particular for an internal combustion engine,
    with a compressor wheel for conveying and compressing a gas, having an axial intake end and a radial exhaust end,
    with a compressor wheel space in which the compressor wheel is arranged and which extends from the intake end to the exhaust end,
    with an inlet port leading to the intake end of the compressor wheel,
    with at least one recirculation path which opens at one end into the inlet port and at the other end into the compressor wheel space,
    wherein a control device is provided for modifying a flow-through cross section, namely at least opening and closing the flow-through cross section, of the at least one recirculation path,
    wherein the control device has a control liner, which is arranged in the inlet port, so it is axially adjustable between an open position and a closed position, and
    a port liner provided in a stationary position on the housing and borders the inlet port in the area of the control liner and at least partially borders the compressor wheel space on the outside radially, thereby overlapping with a respective radial recess axially and bordering it on the inside radially,
    wherein the control liner is arranged coaxially with the port liner and the inlet port and is supported on the outside radially on the port liner, so that it is axially adjustable.

2. The radial compressor according to claim 1, characterized in that the control liner has at least one radial passage through which the at least one recirculation path communicates with the inlet port.

3. The radial compressor according to claim 1, characterized in that the control liner has an end section facing the compressor wheel, said end section closing an end of the at least one recirculation path opening into the compressor wheel space in the closed position.

4. The radial compressor according to any claim 3, characterized in that the at least one recirculation path has a radial recess, which is introduced into a housing containing the inlet port and the compressor wheel space.

5. The radial compressor according to claim 4, characterized in that the control liner forms a wall bordering the inlet port and the compressor wheel space along the respective radial recess.

6. The radial compressor according to claim 5, characterized in that at least one of
- in its open position, the control liner with its face end facing the compressor wheel is a distance away from an end of the respective recess facing the compressor wheel space and thus opens the respective recirculation path, and
- in its closed position, the control liner with its face end facing the compressor wheel is in contact with an end of the respective recess facing the compressor wheel space and thus closes the respective recirculation path.

7. The radial compressor according to claim 4, characterized in that the port liner has at least one radial passage through which the respective recirculation path communicates with the inlet port,
- a section of the control liner facing the compressor wheel extends at least one of along and inside the respective recess.

8. The radial compressor according to claim 7, characterized in that at least one of
- in its closed position, the control liner with its face end facing the compressor wheel closes an opening in the respective recirculation path that opens into the compressor wheel space, said opening being formed by a distance between the corresponding ends of the respective recess and the port liner, and
- in its open position, the control liner with its at least one passage is arranged so it is radially aligned with at least one passage in the port liner, and
- the control liner in its closed position closes the at least one passage in the port liner.

9. The radial compressor according to claim 1, characterized in that the radial compressor is used with an exhaust gas turbocharger.

10. The radial compressor according to claim 2, characterized in that the control liner has an end section facing the compressor wheel, said end section closing an end of the at least one recirculation path opening into the compressor wheel space in the closed position.

11. The radial compressor according to claim 2, characterized in that the at least one recirculation path has a radial recess, which is introduced into a housing containing the inlet port and the compressor wheel space.

12. The radial compressor according to claim 2, characterized in that the control liner forms a wall bordering the inlet port and the compressor wheel space along the respective recess.

13. The radial compressor according to claim 3, characterized in that the control liner forms a wall bordering the inlet port and the compressor wheel space along the respective recess.

* * * * *